Oct. 15, 1957 O. ERISH 2,809,504
UNIVERSAL JOINTS
Filed July 2, 1956
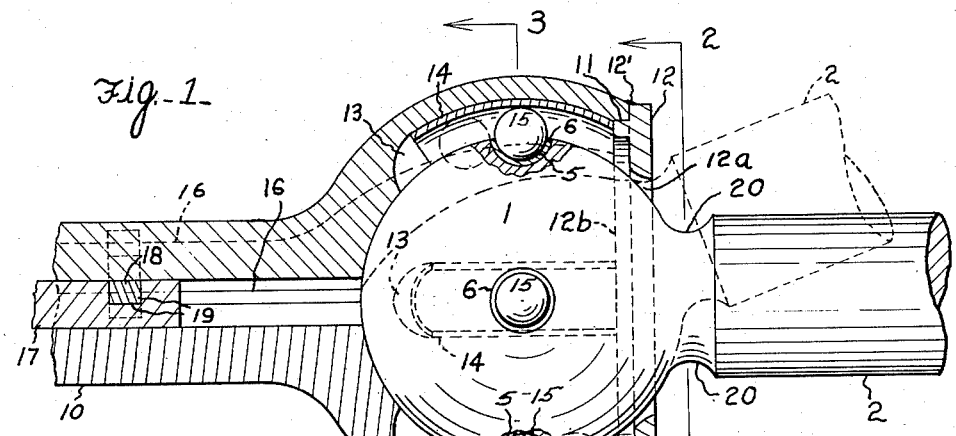
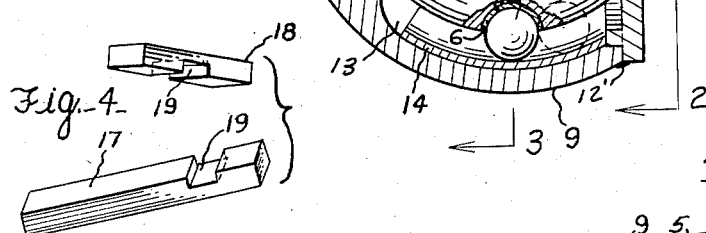
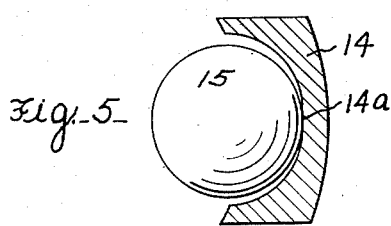
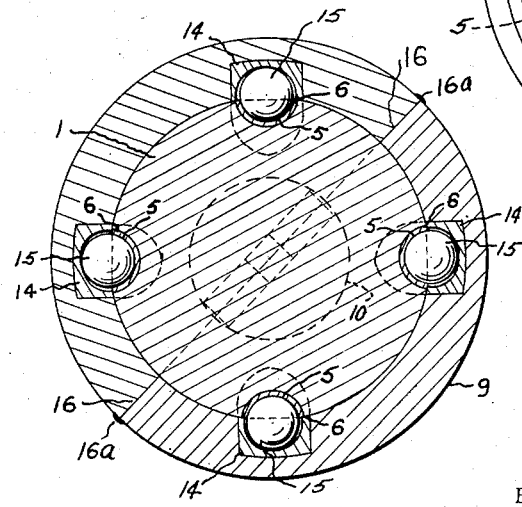
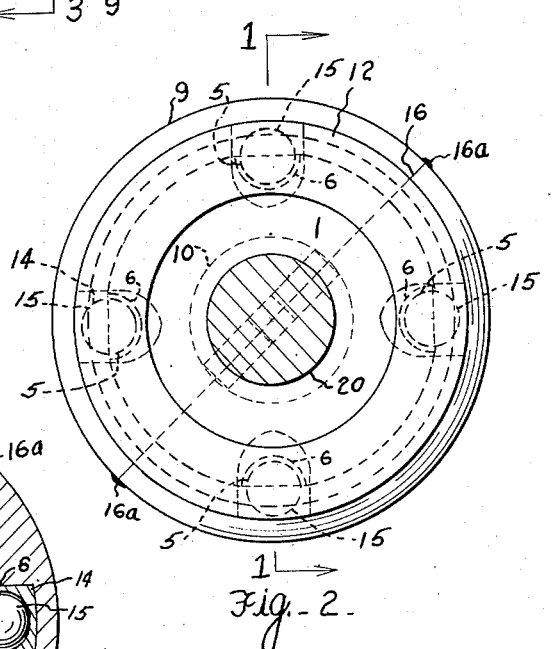
INVENTOR
OTTO ERISH
BY
J. S. Murray
ATTORNEY

United States Patent Office 2,809,504
Patented Oct. 15, 1957

2,809,504

UNIVERSAL JOINTS

Otto Erish, Roseville, Mich.

Application July 2, 1956, Serial No. 595,155

2 Claims. (Cl. 64—7)

This invention relates to universal joints and particularly universal joints for transmitting powerful drives such as those of most motor vehicles. The present application is a continuation in part of my copending application filed November 22, 1954, Serial Number 470,443.

My improved construction is of a type employing ball and socket members and supplemental balls by which power is transmitted from one member to the other.

An object is to set the supplemental balls into the ball member of the joint with protruding portions thereof received by arcuate grooves interiorly formed in said socket member.

Another object is to assure a highly accurate complementary relation of two hemispherical halves forming the socket member of a ball and socket joint.

These and various other objects are attained by the construction hereinafter described and illustrated in the accompanying drawing, wherein:

Fig. 1 is a longitudinal axial section of my improved joint, taken on the line 1—1 of Fig. 2.

Fig. 2 is a diametrical cross section taken on line 2—2 of Fig. 1.

Fig. 3 is a diametrical cross section taken on line 3—3 of Fig. 1.

Fig. 4 is a perspective detail view illustrating a pair of keys adapted for an interlocking engagement.

Fig. 5 is an enlarged fragmentary view of a portion of Fig. 3.

In these views, the reference character 1 designates a ball member integrally formed with a radially projecting shank 2. Opening in the periphery of the ball member are two pairs of hemispherical sockets 5, each such pair being opposed diametrically and transversely to the extended axis of the shank. Also the diameters along which the sockets 5 of each pair are spaced are relatively transverse, creating ninety degree angles between the axis of the several sockets, as best appears in Fig. 3. Press fitted or otherwise tightly retained in each socket 5 is a hemispherical liner 6 of steel or other material highly resistant to wear.

The ball member 1 is centrally and rotatively set into a socket member 9 from which a shank 10 integrally projects in a generally opposed relation to the shank 2. In diametrically opposed relation to the shank 10, the socket member is formed with a circular opening 11 which truncates the socket receiving the ball member 1. Extending across such opening is an annular dust excluding plate 12 welded as indicated at 12' to the socket member 9 and having its central opening 12a substantially registered with said opening of the socket member. The openings 11 and 12a accommodate the shank 2, affording the latter such clearance as is requisite to a desired relative angular play of the universally joined members. It is preferred to form the plate 12 with an annular rib 12b which is set into the opening 11 of the socket member to assure a coaxial relation of said plate and socket member.

Formed interiorly of the socket member and extending substantially from the plate 12 are two relatively transverse pairs of arcuate grooves 13 whose intersecting transverse axes of curvature occupy a plane transverse to the extended axis of the shank 10. Press-fitted or otherwise fixed in these grooves are arcuately elongated liners 14 of steel or other highly wear resistant material. The grooves 13 form raceways for torque-transmitting balls 15 set rotatively into the opposed sockets 5. The balls 15 will vary their position in the grooves 13 responsive to any variation in the angular relation of the shanks 2 and 10, but will obviously continue to transmit torque in any such variant positions. In the preferred construction, the balls 15 are set substantially equally into the sockets 5 and grooves 13 so as to substantially eliminate any torque component exerting either an inward or outward thrust on such balls.

To facilitate disposal and retention of the ball member in the socket member, it is preferred to form the latter in two substantially duplicate halves meeting as indicated at 16 at the axis common to the member 9 and its shank 10. Said halves are rigidly interconnected, preferably by seam welding as indicated at 16a, and the complementary relation of the halves is further maintained by rectangular keys 17 and 18. The key 17, which is relatively long, is disposed at the axis of the shank being set equally into each half of the latter. The key 18 extends diametrically through the shank, and the two keys are transversely grooved at 19 to each receive a portion of the other, whereby each restrains the other from endwise shifting. Said keys must of course be properly disposed in the assembly prior to welding, and assist materially in establishing an accurate complementary relation of the halves preliminary to welding. It is preferred to form the shank 2 with a reduced neck 20 adjoining the ball member 1 to increase the angular play afforded by the openings 11 and 12a.

The described universal joint has the advantages of simplicity combined with great strength, while permitting at least as much divergency between driving and driven members as is ordinarily required. Transmission of a drive is accomplished with a minimum of friction due to free rolling of the balls 15. The shanks 2 and 10 may be rigidly engaged with shafts (not shown) or other drive-transmitting members in any well known manner.

It will be noted that the width of the runways 14 slightly exceeds the diameter of the balls 15 so that the balls may have a slight play transverse to the runways, as best appears in Fig. 5. For that purpose a narrow bottom portion 14a of each runway has no transverse curvature. This compensates for the slight convergency of each pair of opposed runways toward the other pair. Requisite rolling travel of the balls is sufficiently slight that consequent lateral play of the balls in their runways will not entail objectionable backlash. In Fig. 1 there are shown in dash lines substantially the maximum deviation from alignment that may be required of the shanks 2 and 10 and the corresponding travel imposed on the balls 15.

What I claim is:

1. A universal joint comprising a socket member and a ball member rotatively fitted in the socket member, such members being formed with oppositely projecting shanks, and the socket member having a circular opening diametrically opposed to its shank and centered substantially in the extended axis of such shank, and accommodating the shank of the ball member and affording a predetermined relative angular play of the two shanks, a relatively small ball set rotatively into the peripheral face of the ball member and outwardly projecting from such face, and centered at a radius of the ball member substantially transverse to the extended axis of the shank of such member, the socket member being interiorly formed with an arcuate groove receiving and guiding the relatively small ball, such groove extending substantially from said opening of the socket member toward the shank of such member, the socket member together with its shank being formed in substantially duplicate halves substantially meeting at the axis common to such member and its shank, means rigidly interconnecting said halves, a rectangular key set centrally into the shank at its axis and similarly engaging both halves of the shank, and a rectangular key set transversely into the last mentioned shank at the juncture of its halves and having an interlocking engagement with the first mentioned key.

2. A universal joint comprising a socket member and a ball member rotatively fitted in the socket member, such members being formed with oppositely projecting shanks, the socket member being formed in substantially duplicate halves substantially meeting at the extended axis of the shank of such member and having a circular opening diametrically opposed to such shank, an annular plate extending across said circular opening and accommodating the shank of the ball member and affording an angular play of such shank induced by relative rotation of the ball and socket members, means rigidly securing such plate to both halves of the socket member, and a relatively small ball set rotatively into the peripheral face of the ball member and outwardly projecting from such face, and centered at a radius of the ball member substantially transverse to the extended axis of the shank of such member, the socket member being interiorly formed with an arcuate groove receiving and guiding the relatively small ball, such groove extending substantially from said opening of the socket member toward the shank of such member, said annular plate being formed with a circular rib coaxial with said plate and set snugly into said circular opening of the socket member, whereby the halves of such member are accurately maintained in their complementary relation.

References Cited in the file of this patent

UNITED STATES PATENTS

| | | |
|---|---|---|
| 1,199,662 | Campbell | Sept. 26, 1916 |
| 2,381,096 | Abbott | Aug. 7, 1945 |